Sept. 26, 1961 C. K. BENSON ET AL 3,001,780
HEATING UNIT AND METHOD
Filed Feb. 10, 1958

INVENTORS
Clark K. Benson
BY Andrew A. Caridis

Attorneys

3,001,780
HEATING UNIT AND METHOD

Clark K. Benson, San Francisco, and Andrew A. Caridis, Millbrae, Calif., assignors to Heat and Control Inc., San Francisco, Calif., a corporation of California
Filed Feb. 10, 1958, Ser. No. 714,345
9 Claims. (Cl. 263—42)

This invention relates generally to a heating unit and method for carrying out certain types of heating operations.

In the past it has been difficult to heat certain materials rapidly without scorching the material, particularly where the material is sensitive to heat or where it is desired to heat only small quantities of the material within a relatively large vessel or reactor. In such operations, it also has been difficult to obtain a uniform heat transfer over the entire heating surface.

In general it is an object of the present invention to provide a heating unit and method in which a uniform heat transfer is obtained over the entire heating surface.

It is another object of the invention to provide a heating unit and method of the above character in which the heating unit employs one or more zones to make possible such uniform heat transfer and the heating of small batches of material.

Another object of the invention is to provide a heating unit and method of the above character in which the firing is applied tangentially to provide a whirling, radiant heating action about the heating vessel.

Another object of the invention is to provide a heating unit and method of the above character which prevents substantial heat transfer between zones.

Another object of the invention is to provide a heating unit and method of the above character in which the exhaust from the zones is withdrawn from between the zones.

Another object of the invention is to provide a heating unit and method of the above character in which firing is applied about the perimeter of the vessel and in which the exhaust gases are withdrawn from about the perimeter of the vessel.

Additional objects and features of the invention will appear from the following description in which the preferred embodiment has been set forth in detail in conjunction with the accompanying drawing.

Referring to the drawing.

Figure 1:
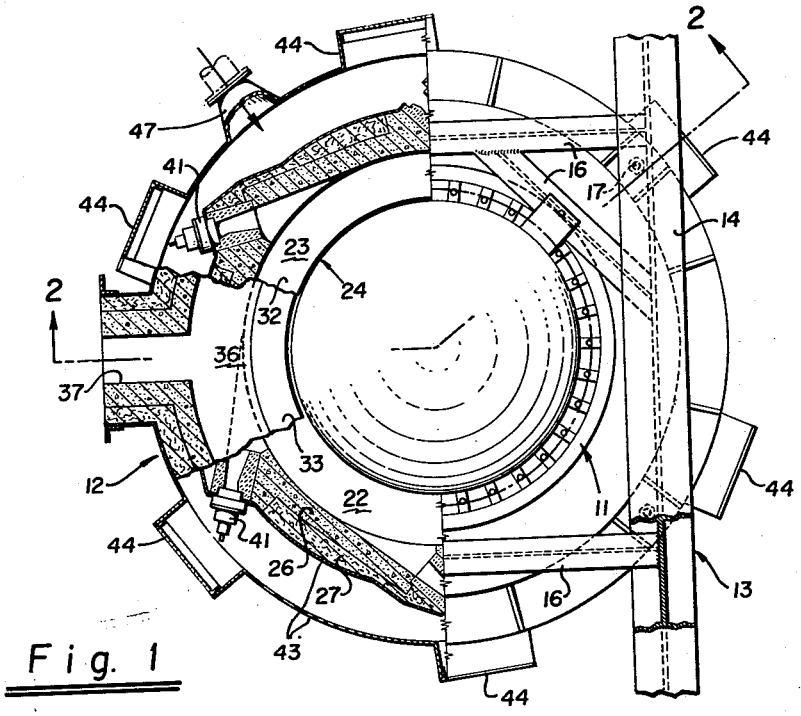
FIGURE 1 is a plan view partly in cross section taken along the line 1—1 of FIGURE 2.
Figure 2:
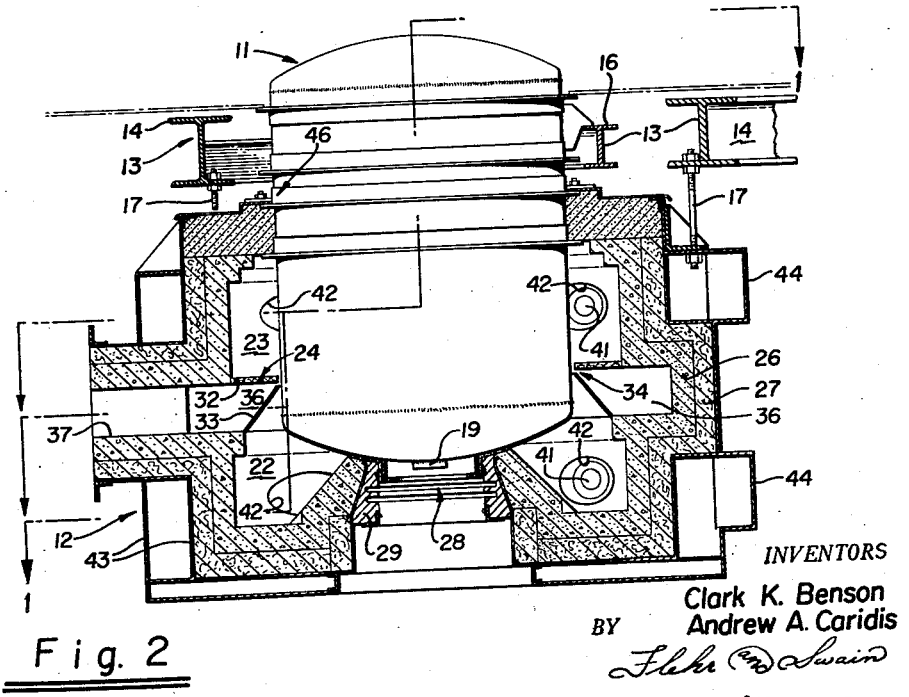
FIGURE 2 is a side elevational view partly in cross section taken along the line 2—2 of FIGURE 1.

In general, the present invention consists of a vessel or reactor having heat conducting walls in which the vessel or reactor is fired or heated in separate zones about the perimeter of the vessel, and in which the zones are separated by a bustle-type flue section about the perimeter of the vessel or kettle. The flue section serves to remove the exhaust gases from and between the zones, and also serves to prevent any substantial heat transfer between the zones.

As shown in the drawing, the heating unit consists of a vessel, kettle or reactor 11 and a fire-box 12 which are supported in a suitable manner such as by suspending the same from a suitable framework 13. The framework consists of primary vessel support beams 14 and secondary vessel support beams 16 which serve to support the vessel or reactor 11. The fire-box 12 is suspended from the primary support beams 14 by suitable means such as the hanger rods 17.

As shown in the drawing, the vessel or kettle 11 is suspended in the fire-box 12. The vessel is of the totally enclosed type and is provided with a bottom center drain plug 19. The vessel 11 can be of any desired shape such as cylindrical, as shown, and can be formed of any suitable heat conducting material such as stainless steel.

The fire-box 12 is of the type which can be divided into multiple zones, and as shown in the drawing, is divided into lower and upper zones 22 and 23 which are adapted to receive a gaseous medium for affecting a heat transfer with respect to separate portions of the walls of the vessel. The zones 22 and 23 lie in parallel planes and are in juxtaposition. The zones extend about the perimeter of the vessel and are separated by a bustle-type flue section 24. It is readily apparent that if more than two zones are required, additional bustle-type flue sections may be utilized for separating the zones for purposes hereinafter described.

The fire-box consists of a light weight refractory lining 26 which is backed up by another lining 27 made up of insulating block having good insulating properties with low heat storage. The refractory lining 26 is of the type which will absorb heat rapidly and which will quickly become a large radiating surface.

Access to the drain plug 19 is provided by the stainless steel Sylphon type seal 28 of the type well known to those skilled in the art. A good seal is established between the Sylphon 28 and the linings 26 and 27 by insulating cement 29. The Sylphon 28 takes care of the different rates of expansion of the vessel 11 and the fire-box 12 during heating and cooling of the same.

The bustle-type flue section 24 extends about the perimeter of the vessel and consists of a pair of annular members 32 and 33 which encircle the vessel 11 and provide an annular inlet 34 adjacent the walls of the vessel. Annular member 32 is substantially horizontal whereas annular member 33 is inclined toward the member 34. The annular members 32 and 33 are secured to the refractory lining 26 and therewith provide a passage 36 which is in communication with the inlet 34 and with a flue 37. The flue 37 is adapted to be connected to a suitable stack or induced draft device (not shown). A layer 38 of insulating material is mounted on the upper surface of the annular member 32 and serves to prevent the transfer of heat, particularly radiant heat, from the lower zone to the upper zone and vice versa.

A plurality of burners 41 are mounted in tangentially disposed burner ports 42 in each zone 22 and 23 of the fire-box and are directed in such a manner that they fire gaseous mediums tangentially about the perimeter of the vessel or kettle to cause the gaseous mediums to whirl about the vessel to provide a radiant heating action. The burners in the zone 22 provide such a whirling radiant heating action about the lower bottom portion of the vessel 11 whereas the burners in the upper zone will provide such heating action in the intermediate portion of the vessel. The burners, as shown in each zone, lie in substantially horizontal planes and are disposed at equal distances between the upper and lower sides of the zones.

Preferably, the burners are of the type adapted to produce what is known as a tempered flame, or in other words, a flame in which the temperature is regulated by means of varying the relative amount of excess air introduced by way of the burner ports. To accomplish this, the flow of combustion supporting air is kept at a maximum constant rate, and the flow rate of the gas or the fuel flow is varied with the heat requirements. Such an arrangement promotes maximum circulation of hot gases in the zones 22 and 23, and thus makes for maximum uniformity of heat in each of the zones. At high input rates, the burner flame is relatively long and luminous, while at minimum input rate, it is short and clear, due to the excess air and the resulting heating temperature is relatively low. The burners, as hereinbefore described, are disposed so that the flame from the burners tangentially wipes the side walls of the vessel or reactor 11 to create the whirling motion of the gases about the vessel in the annular zones which encircle the vessel to thereby effect a heat exchange between with respect to the side walls of the vessel.

The fire-box is enclosed within a jacket or casing 43 of suitable material such as fabricated steel and is provided with a plurality of access hatches 44 to provide access to the burners 41. A suitable seal is provided between the jacket, the vessel 11 and the upper portion of the fire-box by a diaphragm type of seal 46 well known to those skilled in the art.

The jacket 43 is provided with an air connection 47 through which air is continually introduced under pressure into the annular passages between the jacket and the fire-box, and from which air is supplied to the burners 41. The circulating air in the jacket serves to prevent overheating of the jacket.

The upper portion of the vessel 11 above the fire-box is preferably covered with insulation (not shown) to prevent heat loss from the vessel and to prevent accidental contact with the vessel.

Operation of our heating unit in performing our method may now be described as follows: Let it be assumed that it is desired to heat a full batch of material in the vessel 11. After the material has been introduced into the vessel 11, the burners 41 in both the upper and lower zones can be started. The hot gases from the burners 41 will be projected tangentially about the perimeter of the vessel 11 to provide a whirling action which continuously wipes the sides of the vessel to provide maximum circulation within the zone and at the same time to cause a uniform heat transfer through the walls of the vessel to the material being heated. By utilizing two separate rows of burners separated into zones, a much larger and more uniform heat distribution is obtained.

Exhaust gases from the two zones 22 and 23 are exhausted through the bustle-type flue section 24 and into the flue 37. Since the opening 34 into the flue section is immediately adjacent the vessel 11, the exhausting gases must wipe the sidewalls of the vessel before they can pass into the flue 37. By positioning of the flue section 24 between the two zones, one flue section can serve both zones.

The flue section 24, in addition to serving as a means for withdrawing gases, also provides means for separating the two zones. This is particularly important when it is desired to heat smaller batches such as one-quarter of a batch in the vessel 11. In such a case, only the burners in the lower zone would be operated. The flue section 24 together with the insulation 38 prevents any substantial heat transfer into the upper zone 23. The insulation 38 particularly prevents the transfer of radiant heat from the lower zone to the upper zone. This is particularly important because if heat is allowed to pass into the upper zone 23, the intermediate portion of the vessel 11 may become overheated and cause charring or burning of the material being heated in the vessel.

By way of example, in one embodiment of our invention in which a two thousand gallon reactor was utilized, it was found that a full batch of material consisting of 16,000 pounds of linseed oil with an average specific heat of 0.65 could be heated from 100° F. to 600° F. at a rate of approximately 3.5° F. per minute. This gave a total heating time of 2.34 hours when starting with a cold setting and utilizing both heating zones 22 and 23. With a one-quarter batch of 4,000 pounds of linseed oil and starting with a cold setting, it was found to require approximately 2.1 hours to reach a batch temperature of 600° F., or at a rate of 4.0° F. per minute when utilizing only the bottom heating zone 22. It was found that uniform heating was obtained without overheating any portion of the vessel or charring or burning of the material being heated.

The position of the exhaust vent or flue section 24 determines the minimum batch which can be heated in the vessel. It is desirable that the upper level of the minimum batch be above the vent or flue section 24. It is readily apparent that the heating unit can be designed for smaller batches merely by lowering the exhaust vent 24.

It is apparent from the foregoing that we have provided a new and improved heating unit and method in which a uniform heat transfer is obtained over the entire heating surface, and that it is possible to heat small batches by providing a definite heat cut-off between zones in the fire-box. It is readily apparent that more than two zones can be provided if desired, and that additional gas withdrawing vents or flue sections can be provided for separating the zones. It is also readily apparent that with the type of construction herein described, one zone could be utilized for heating while another zone could be utilized for cooling, or both zones could be used for cooling merely by introducing gases into the zones at the proper temperatures.

We claim:

1. In a heating unit, a vessel adapted to hold a quantity of material and having heat conductive walls, first means enclosing a predetermined portion of said vessel to provide an enclosed space about the vessel, and means dividing the enclosed space into at least two separate compartments each enclosing different areas of said vessel, each compartment being adapted to receive a gaseous medium for effecting a heat exchange with respect to said different areas of said vessel, said last-named means defining an enclosed flue passage, separating the same from said compartments and providing an inlet to said flue passage from each of said compartments for withdrawing gases from the compartments.

2. A heating unit as in claim 1 wherein the compartments and said flue passage extend about the perimeter of the vessel.

3. A heating unit as in claim 2 wherein said inlet to said flue passage from said compartments is a peripherally continuous opening in said means adjacent the side wall of said vessel.

4. A heating unit as in claim 1 wherein burner means are positioned in said compartments, a jacket surrounding said first means, and means for introducing air into said jacket to supply air to said burner means.

5. In a heating unit, a vessel adapted to hold a quantity of material and having heat conductive walls, means enclosing a predetermined portion of the vessel to provide an enclosed space about the vessel, and means defining a flue passage mounted on said enclosing means and projecting into said space and serving to divide the enclosed space into at least two separate compartments, said means and passage serving to inhibit heat transfer between the compartments, each compartment being adapted to receive a gaseous medium for effecting a heat exchange with respect to separate portions of said walls, said flue passage having inlet means for withdrawing gases from each of said compartments.

6. A heating unit as in claim 5 wherein said enclosed space extends about the perimeter of the vessel and wherein said inlet is a continuous opening which extends about the perimeter of the vessel.

7. A heating unit as in claim 6 wherein said inlet is relatively close to the sidewalls of the vessel.

8. A heating unit as in claim 5 wherein said means defining said flue passage consists of a horizontal member, and an inclined member inclined inwardly toward the vessel and upwardly toward the horizontal member to provide in conjunction with the horizontal member a continuous inlet extending about the perimeter of the vessel.

9. A heating unit as in claim 5 wherein said fire-box means includes burner means for inducing heated gases into at least one of said zones, said burner means being arranged to cause the heated gases to wipe tangentially the sidewalls of the vessel, together with a jacket surrounding said fire-box, and means for introducing air into said jacket to supply air to said burner means.

References Cited in the file of this patent

UNITED STATES PATENTS

| | | |
|---|---|---|
| 1,558,976 | Garabrant et al. | Oct. 27, 1925 |
| 2,227,086 | Hayter et al. | Dec. 31, 1940 |
| 2,809,026 | Bagley | Oct. 8, 1957 |

FOREIGN PATENTS

| | | |
|---|---|---|
| 23,171 | Austria | Sept. 15, 1905 |